US011375673B2

(12) United States Patent
Lin et al.

(10) Patent No.: US 11,375,673 B2
(45) Date of Patent: Jul. 5, 2022

(54) LANDSCAPE EDGING WITH A STONE SURFACE AND MANUFACTURING METHOD AND INSTALLATION SYSTEM THEREOF

(71) Applicants: Liang Lin, Wenzhou (CN); Edwin Geurtsen, Huizen (NL)

(72) Inventors: Liang Lin, Wenzhou (CN); Edwin Geurtsen, Huizen (NL)

( * ) Notice: Subject to any disclaimer, the term of this patent is extended or adjusted under 35 U.S.C. 154(b) by 479 days.

(21) Appl. No.: 16/330,054

(22) PCT Filed: Oct. 28, 2016

(86) PCT No.: PCT/CN2016/103677
§ 371 (c)(1),
(2) Date: Mar. 1, 2019

(87) PCT Pub. No.: WO2018/076257
PCT Pub. Date: May 3, 2018

(65) Prior Publication Data
US 2019/0223392 A1    Jul. 25, 2019

(51) Int. Cl.
*A01G 9/28* (2018.01)
*B32B 7/12* (2006.01)
*B32B 19/06* (2006.01)
*B32B 33/00* (2006.01)
*B32B 11/10* (2006.01)
(Continued)

(52) U.S. Cl.
CPC .............. *A01G 9/28* (2018.02); *B32B 7/12* (2013.01); *B32B 19/06* (2013.01); *B32B 33/00* (2013.01); *B32B 11/10* (2013.01); *B32B 15/02* (2013.01); *B32B 15/14* (2013.01); *B32B 2305/18* (2013.01); *B32B 2311/00* (2013.01); *B32B 2318/04* (2013.01); *B32B 2395/00* (2013.01); *B32B 2410/00* (2013.01)

(58) Field of Classification Search
CPC .. A01G 9/26; A01G 9/28; B32B 19/06; B32B 33/00
See application file for complete search history.

(56) References Cited

U.S. PATENT DOCUMENTS 4,543,745 A * 10/1985 Beck .................... A01G 9/28
47/33
4,647,491 A * 3/1987 Ireland ................... B32B 3/28
428/137
(Continued)

FOREIGN PATENT DOCUMENTS

CN          102106240 A       6/2011

*Primary Examiner* — Monica L Barlow
*Assistant Examiner* — Aaron M Rodziwicz
(74) *Attorney, Agent, or Firm* — Christensen, Fonder, Dardi & Herbert PLLC

(57) ABSTRACT

A landscape edging for use on a stone surface, the edging solving the problem that known edging has a poor shaping effect, is higher in cost and cannot satisfactorily harmonize with vegetation. The landscape edging comprises an edging body, the edging body having flexibility, and an outer wall thereof being provided with a decoration layer made of stone granules. When in use, an isolation belt can satisfactorily harmonize with the surrounding environment, and has a certain flexibility, can achieve better shaping, has a better usage effect and is a good substitute for an existing landscape edging.

19 Claims, 11 Drawing Sheets

(51) Int. Cl.
    *B32B 15/14*     (2006.01)
    *B32B 15/02*     (2006.01)

(56) References Cited

U.S. PATENT DOCUMENTS

| | | | |
|---|---|---|---|
| 5,077,944 A * | 1/1992 | Backman | A01G 9/28 52/102 |
| 6,622,426 B2 | 9/2003 | Conde | |
| 2005/0150158 A1 * | 7/2005 | Fakhari | A01G 9/28 47/33 |
| 2006/0150480 A1 | 7/2006 | Ruller | |
| 2009/0064571 A1 * | 3/2009 | Fakhari | A01G 9/28 47/33 |
| 2010/0050505 A1 * | 3/2010 | Zwier | A01G 9/28 47/33 |
| 2011/0277395 A1 * | 11/2011 | Wink | E01C 11/222 52/102 |
| 2012/0311927 A1 * | 12/2012 | Bolin | A01G 9/28 47/33 |
| 2015/0342124 A1 * | 12/2015 | Volin | A01G 9/28 47/33 |
| 2016/0242364 A1 * | 8/2016 | Riccobene | A01G 9/28 |
| 2017/0359967 A1 * | 12/2017 | Tetrault | A41D 1/02 |
| 2018/0027746 A1 * | 2/2018 | Stover | A01G 9/28 |
| 2018/0206418 A1 * | 7/2018 | Stover | A01G 9/28 |
| 2018/0255714 A1 * | 9/2018 | Brinner | A01G 9/28 |
| 2019/0186159 A1 * | 6/2019 | Silvestro | E04C 5/161 |
| 2020/0029509 A1 * | 1/2020 | Solis | E04H 17/168 |
| 2020/0178480 A1 * | 6/2020 | Stover | A01G 13/0281 |

\* cited by examiner

LANDSCAPE EDGING WITH A STONE SURFACE AND MANUFACTURING METHOD AND INSTALLATION SYSTEM THEREOF

RELATED APPLICATION

The present application is a National Phase entry of PCT Application No. PCT/CN2016/103677, filed Oct. 28, 2016, the disclosure of which is hereby incorporated by reference herein in its entirety.

FIELD OF THE INVENTION

The invention relates to a separation edging for separating different vegetations or vegetation from paths in gardens, parks, etc., in particular to a landscape edging with a stone surface and a manufacture method and an install system thereof.

BACKGROUND OF THE INVENTION

With the development of the economy, the living standards of people have been greatly improved, and many families (especially foreign families) have their own gardens. Landscape edgings are often used between different vegetations or between vegetation and paths in such gardens or parks. The current landscape edging is generally made of artificial materials such as rubber, plastic and the like. On the one hand, the landscape edging is cumbersome and costly; on the other hand, the landscape edging is not well shaped; moreover, the landscape edging cannot be well integrated with vegetation because of the surfaces of the artificial materials. For example, the U.S. Patent Publication No. US2014/0259902A1, entitled "LANDSCAPE EDGING SYSTEM", discloses a landscape edging install system in which these problems are present.

As another example, Japanese Patent Publication No. JP09-107797A (1997), entitled "Combinable Dividing Board", discloses an isolation edging for a flowerbed, which serves only as an isolation and cannot be well integrated with the surrounding environment.

SUMMARY OF THE INVENTION

In order to overcome the deficiencies of the background art, the invention provides a landscape edging with a stone surface and manufacture methods and install system thereof, which mainly solves the problems of poor shaping effect, high cost and poor fusion with vegetation of the current landscape edging.

The technical solution adopted by the invention is as follows:

a landscape edging with a stone surface, including an edging body which has flexibility and the outer wall thereof is provided with a decorative layer made of stone particles;

the edging body includes a first plate and a second plate, wherein a flexible layer is disposed therebetween; the two ends of the flexible layer are respectively bonded with the first plate and the second plate;

one end of the first plate and the second plate is integrally disposed;

the edging body includes an upper end surface arranged at the top, and a first side surface and a second side surface disposed on both sides; the upper end surface, the first side surface and the second side surface are respectively provided with the decorative layer;

the decorative layer is formed by bonding stone particles;

the first plate and the second plate are made of a non-woven fabric as a base;

the flexible layer is an asphalt layer;

a metal reinforcing wire mesh is further disposed between the first plate and the second plate; and the decorative layer is disposed at the upper end of the edging body, and the lower end of the edging body is provided with an insertion portion inserted into the soil.

A manufacture method for making the landscape edging with a stone surface, comprising the following steps of:

step 1. Gluing: coating an adhesive on one side of a base material;

step 2. Paving stones: paving screened stone particles on the base material and bonding by the adhesive;

step 3. Flattening stones: flattening the paved stone particles by a flat tool;

step 4. Picking stones: removing redundant stones;

step 5. Coagulating gel: standing for 20 to 30 hours for the adhesive to set; and step 6. Molding: applying the heated asphalt mixture to the other side of the base material, and folding the base material and bonding together by the asphalt mixture to produce the edging body.

The asphalt mixture comprises 20%-40% of bitumen, 5%-20% of a flexible substrate and 55%-75% of a filler in mass percentage.

The flexible substrate is SBS or styrene butadiene rubber or styrene-ethylene/butylene-styrene block copolymer (SEBS) or styrene ethylene/propylene-styrene block copolymer or polyisoprene.

The filler is calcium carbonate powder or wollastonite.

The stone particles were screened by a sieve having a pore size of 1 to 5 mm.

A install system for installing the landscape edging with a stone surface comprising a installing bracket, wherein one end of the installing bracket is provided with a fixing pile inserted into the soil, and the other end is provided with a installing groove detachably matched with the edging body.

The outer wall of the fixing pile is provided with a plurality of barbs.

The inner walls of the two sides of the installing groove are correspondingly provided with snap protrusions.

The snap protrusion has a trapezoidal cross section.

The bottom of the fixing pile has a triangular cross section.

The intermediate shaft of the fixing pile and the intermediate shaft of the installing groove are eccentrically disposed.

The side of the barb is provided with an arc-shaped surface.

Also included is a connecting member for joining adjacent two edging bodies; the connecting member is provided with a clamping groove for gripping the edging body.

The inner wall of the clamping groove is further provided with clamping teeth.

The invention has the beneficial effects that the invention provides a landscape edging with a stone surface and install system, comprising an edging body that has flexibility and the outer wall thereof is provided with a decorative layer made of stone particles. The isolation edging can be well integrated into the surrounding environment when being used, and it has a certain flexibility, can be better shaped and has a better effect. It is a good alternative for the existing landscape edging.

DETAILED DESCRIPTION OF THE INVENTION

The present invention will be further described below with reference to the accompanying drawings: as shown in the figure, a landscape edging with a stone surface, comprising an edging body (1) having flexibility and the outer wall thereof is provided with a decorative layer (2) made of stone particles. The decorative layer herein may be made of various materials, such as pebbles, gravel particles, etc. These stones may be natural stones or artificially processed stones, and may be selected according to different scenes. The edging body has flexibility, and the edging body itself may be made of a flexible material, or may be provided with a flexible additive layer. The flexible material herein may be aluminum, flexible plastic or the like. The edging body may be in various shapes such as strip shape, wave shape and the like, and may be selected according to actual requirements. The invention provides a landscape edging with a stone surface and manufacture methods and install system thereof, comprising an edging body having flexibility and the outer wall thereof is provided with a decorative layer. Furthermore, the decorative layer may be made of stone, so that the isolation edging can be well integrated into the surrounding environment when being used. In addition, the isolation edging has a certain flexibility, which can be better shaped and has a better effect. It is a good alternative for the existing landscape edging.

Figure 1:
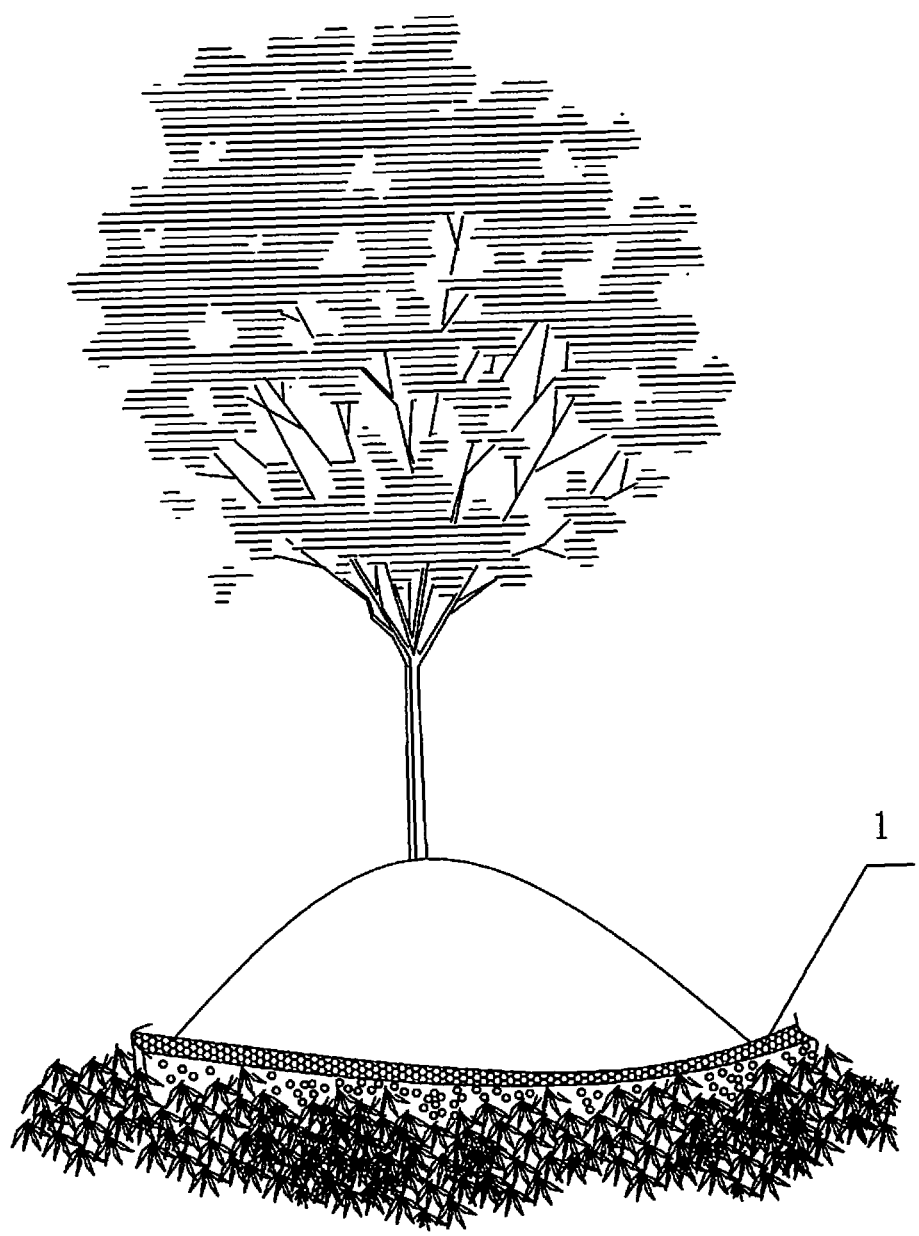
FIG. 1 is a schematic view showing the state of use of one embodiment of the present invention.
Figure 2:
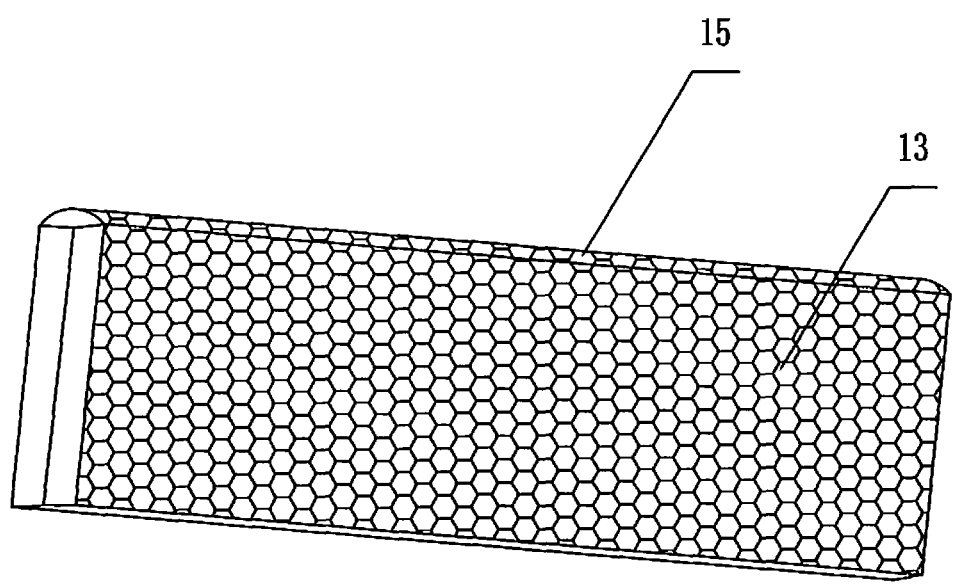
FIG. 2 is a schematic perspective view of one embodiment of the present invention.
Figure 3:
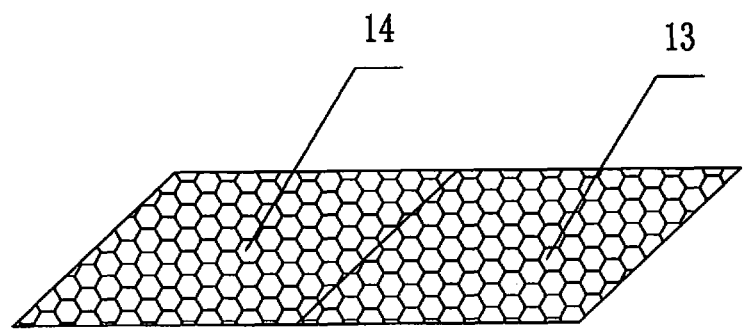
FIG. 3 is a flattened schematic view of one embodiment of the present invention.
Figure 4:
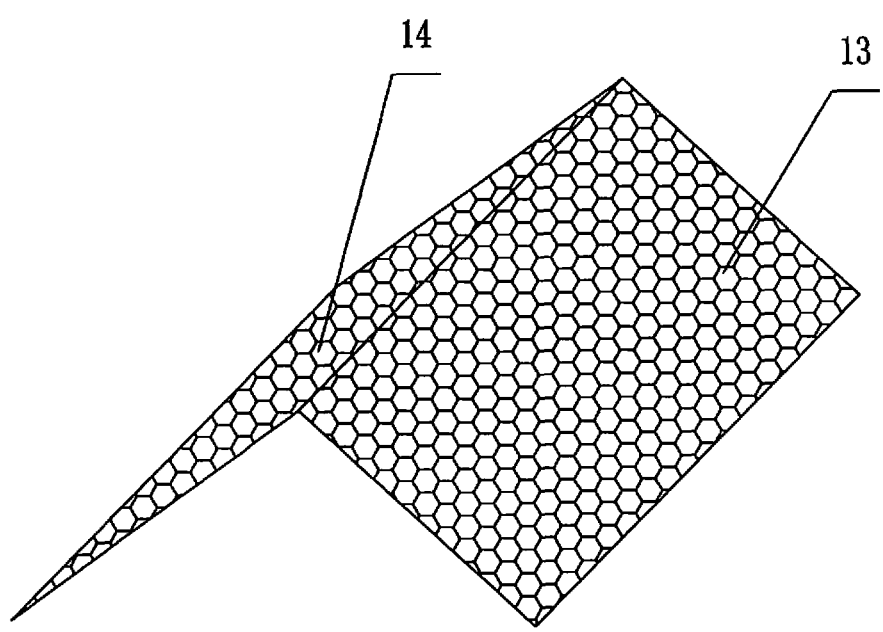
FIG. 4 is a schematic view of one embodiment of the present invention.
Figure 5:
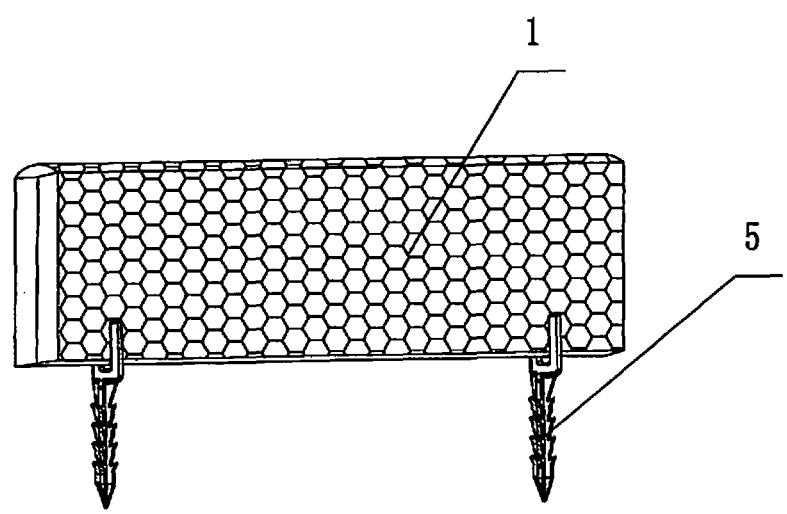
FIG. 5 is a schematic perspective view of one embodiment of the present invention mounted with a installing bracket.
Figure 6:
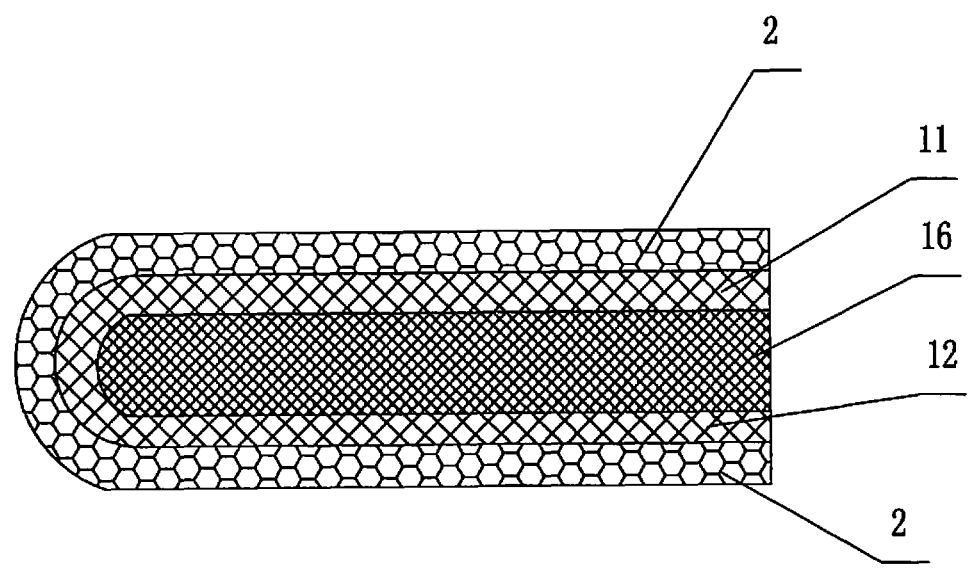
FIG. 6 is a schematic cross-sectional view of one embodiment of the present invention.
Figure 7:
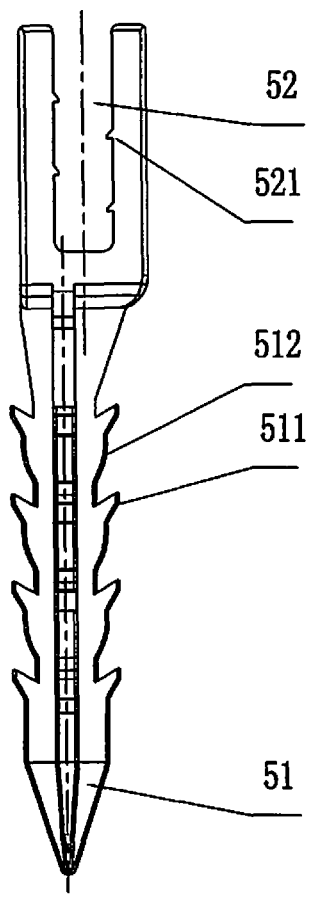
FIG. 7 is a schematic perspective view of a installing bracket according to one embodiment of the present invention.
Figure 8:
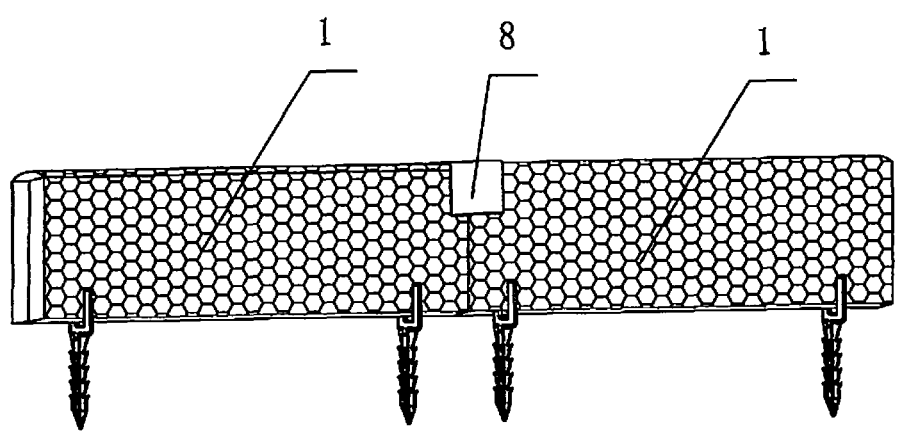
FIG. 8 is a schematic perspective view of one embodiment of the present invention with the connecting member and installing bracket mounted together.
Figure 9:
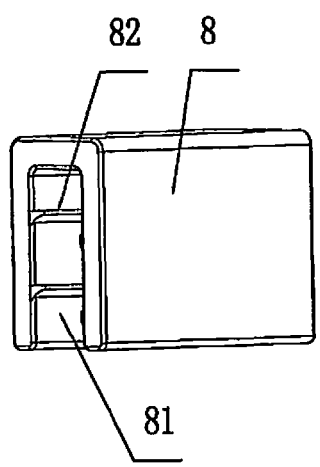
FIG. 9 is a schematic perspective view of a connecting member according to one embodiment of the present invention.
Figure 10:
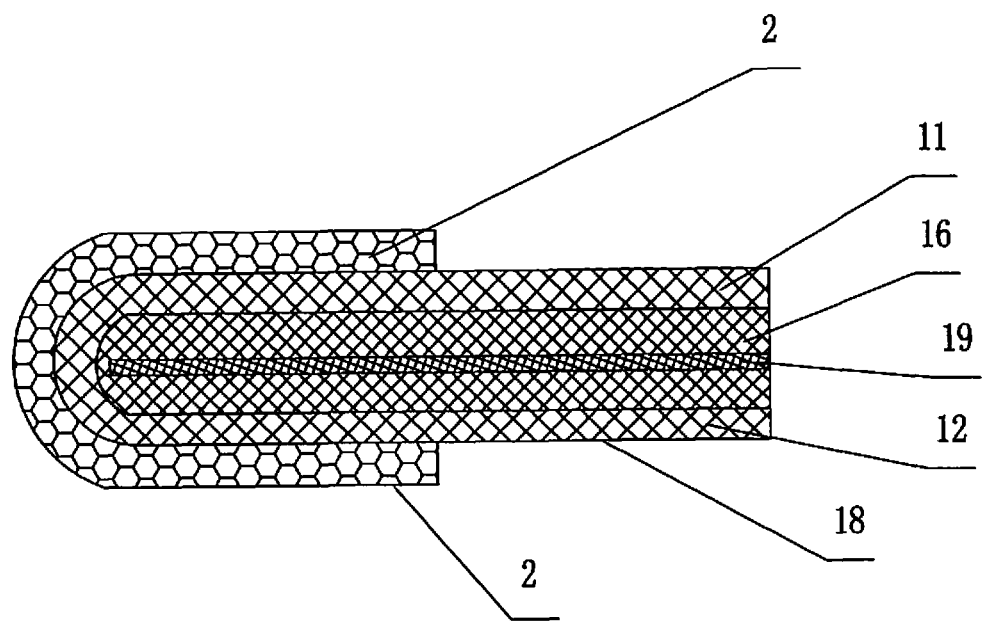
FIG. 10 is a schematic cross-sectional view of a connecting member according to another embodiment of the present invention.
Figure 11:
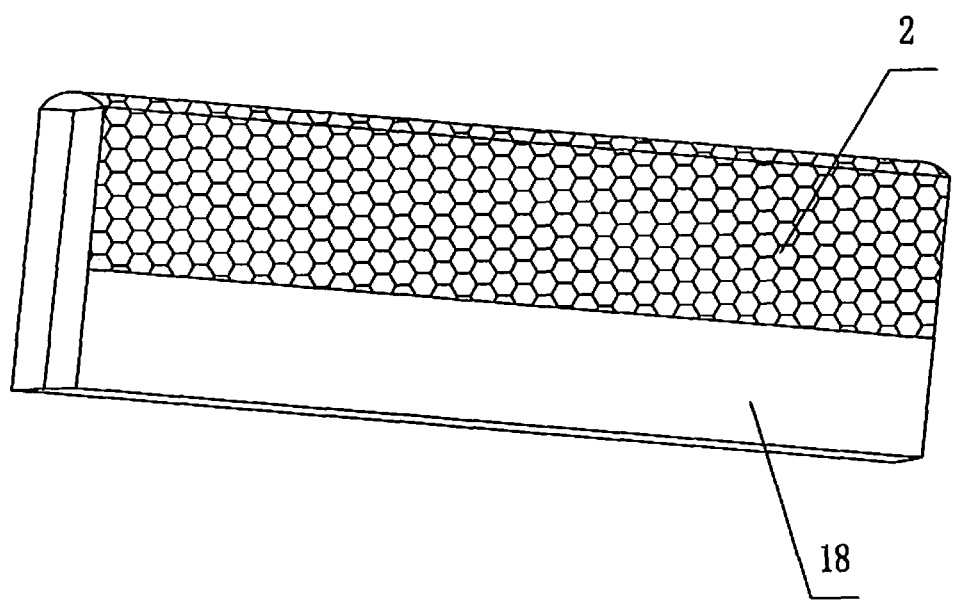
FIG. 11 is a schematic perspective view of a connecting member according to another embodiment of the present invention.

In this example, as shown in the drawings, the edging body includes a first plate 11 and a second plate 12, wherein a flexible layer 16 is disposed therebetween; the two ends of the flexible layer 16 are respectively bonded with the first plate 11 and the second plate 12. The edging body is formed by bonding the first plate and the second plate, wherein the first plate and the second plate may be two separate plates, or may have a structure similar to a greeting card; as shown in FIG. 2, the first plate and the second plate have the structure in which the edging body is flattened, wherein the flexible layer may be a layer of adhesive material, or may be coated with adhesive on both ends of the additional intermediate plate. In this patent, as a preferred layer of adhesive material, it is possible to reduce the cost and be lighter.

In this example, as shown in the drawings, one end of the first plate 11 and the second plate 12 is integrally disposed. Preferably, the first plate and the second plate in the application have a structure in which the edging body is flattened.

In this example, as shown in the drawings, the edging body 1 includes an upper end surface 15 arranged at the top, and a first side surface 13 and a second side surface 14 disposed on both sides; the upper end surface 15, the first side surface 13 and the second side surface 14 are respectively provided with the decorative layer 2. Preferably, the edging body in the patent has an elongated strip shape, and the upper end surface and the side surfaces on both sides are provided with a decorative layer, so that a three-dimensional decorative effect can be achieved; compared with the prior art that most of the conventional prior art are single-sided material structures, an unexpected effect is achieved. When being used outdoors or indoors, the edging body can be better integrated with the environment by matching optional materials.

In this example, as shown in the drawings, the first plate 11 and the second plate 12 are made of a non-woven fabric as a base. The non-woven fabric has the characteristics of moisture resistance, air permeability, flexibility, light weight, no combustion supporting, easy decomposition, no toxicity, no irritation, low price, recyclability and the like. The product thus prepared is light in weight, low in cost and convenient to use.

In this example, as shown in the drawings, a metal reinforcing wire mesh 19 is further disposed between the first plate 11 and the second plate 12, which increases toughness, stability and service life.

In this example, as shown in the drawings, the decorative layer 2 is disposed at the upper end of the edging body 1, and the lower end of the edging body 1 is provided with an insertion portion 18 inserted into the soil. The upper portion of the edging body is provided with a layer on the exposed surface, and the lower portion is inserted into the soil without a decorative layer for material saving.

In this example, as shown in the drawings, the flexible layer is an asphalt layer. Preferably, the asphalt is used for adhesion in the patent with bonding and shaping effect, and the molding effect is better.

A manufacture method for making the landscape edging with a stone surface, characterized in that comprising the following steps of:

step 1. Gluing: coating an adhesive on the outer surface of a base material;

step 2. Paving stones: paving screened stone particles on the outer surface of the base material and bonding by the adhesive;

step 3. Flattening stones: flattening the paved stone particles by a flat tool;

step 4. Picking stones: removing redundant stones;

step 5. Coagulating gel: standing for 20 to 30 hours for the adhesive to set; and step 6. Molding: applying the heated asphalt mixture to the outer surface of the base material, and folding the base material and bonding together by the asphalt mixture to produce the edging body. The edging body prepared thereby is light in weight and convenient for molding.

The asphalt mixture comprises 20%-40% of bitumen, 5%-20% of a flexible substrate and 55%-75% of a filler in mass percentage.

The flexible substrate is SBS or styrene butadiene rubber or styrene-ethylene/butylene-styrene block copolymer (SEBS), styrene ethylene/propylene-styrene block copolymer (SEPS) or polyisoprene.

The filler is calcium carbonate powder or wollastonite.

The stone particles were screened by a sieve having a pore size of 1 to 5 mm. On the one hand, The stone screened thereby is convenient to process; on the other hand, it is more attractive and convenient for usage.

In this example, as shown in the drawings, a install system for installing the landscape edging with a stone surface comprising a installing bracket 5, wherein one end of the installing bracket 5 is provided with a fixing pile 51 inserted into the soil, and the other end is provided with a installing groove 52 detachably matched with the edging body 1. The installing bracket here is used to insert the fixing pile into the soil for fixing, and the edging body is installed in the installing groove. Preferably, the edging body is installed by the snap fit; the dimension in the width direction of the edging body is matched with the width of the installing groove to form a snap fit, which is convenient to disassemble and assemble, and the effect in use is excellent.

In this example, as shown in the drawings, the outer wall of the fixing pile 51 is provided with a plurality of barbs 511 which prevent accidental release when the fixing pile is inserted into the soil, and the installation is more stable.

In this example, as shown in the drawings, the inner walls of the two sides of the installing groove 52 are correspondingly provided with snap protrusions 521. After the edging body is installed in place, the snap protrusions are abutted on two sides of the edging body to further enhance the stability and convenience of the installation.

In this example, as shown in the drawings, the snap protrusion 521 has a trapezoidal cross section. The trapezoid has an inclined surface with the function of guiding and sliding when the edging body is clamped and installed, and the function of falling prevention after the edging body is installed in place; it is convenient to install and stable in use.

In this example, as shown in the drawings, the bottom of the fixing pile 51 has a triangular cross section, so that it is more convenient to be inserted into the soil with small resistance.

In this example, as shown in the drawings, the intermediate shaft of the fixing pile 51 and the intermediate shaft of the installing groove 52 are eccentrically disposed. The intermediate shaft as the preferred fixing pile is eccentrically disposed with the intermediate shaft of the installing groove, so that when the installing bracket is to be mounted after the edging body is mounted in the installing groove, it is convenient for installation without occlusion.

In this example, as shown in the drawings, the side of the barb 511 is provided with an arc-shaped surface 512, so that it is smoother and more convenient to insert the fixing pile into the soil.

In this example, as shown in the drawings, also included is a connecting member 8 for joining adjacent two edging bodies 1; the connecting member 8 is provided with a clamping groove 81 for gripping the edging body 1. When a plurality of edging bodies are connected, the connecting member can be used for joining two adjacent edging bodies, which makes the assembly more stable.

In this example, as shown in the drawings, the inner wall of the clamping groove 81 is further provided with clamping teeth 82. Being fixed by clamping teeth makes installation easier.

The examples are not to be considered as limiting the invention, but any modifications made based on the spirit of the invention are intended to be within the scope of the invention.

The invention claimed is:

1. A landscape edging with a stone surface, comprising:
a flexible edging body, including:
a folded base portion having a first plate, a second plate, and a curved portion, the first plate and the second plate integrally connected by the curved portion, and the first plate being positioned opposite the second plate, and wherein outer surfaces of the first plate, second plate and curved portion form a continuous outer wall of the flexible edging body;
a flexible layer disposed between, and directly bonded to, an inside surface of the first plate, an inside surface of the second plate, and is directly bonded to an inside surface of the curved portion; and
a decorative layer comprised of stone particles disposed on the outer wall of the flexible edging body.

2. The landscape edging with a stone surface of claim 1, wherein the edging body further includes an upper end surface arranged at a top of the landscape edging, the decorative layer also disposed on the upper end surface.

3. The landscape edging with a stone surface of claim 1, wherein the first plate and the second plate are made of a non-woven fabric.

4. The landscape edging with a stone surface of claim 1, wherein the flexible layer is an asphalt layer.

5. The landscape edging with a stone surface of claim 1, wherein a metal reinforcing wire mesh is further disposed between the first plate and the second plate.

6. The landscape edging with a stone surface of claim 1, wherein the decorative layer is disposed at an upper end of the edging body, and a lower end of the edging body further includes an insertion portion configured to be inserted into the soil.

7. A manufacturing method for making the landscape edging with a stone surface as claimed in claim 1, comprising the following steps of:
coating an adhesive on one side of the base portion;
paving screened stone particles on the base portion and bonding the stone particles to the base portion with the adhesive;
flattening the paved stone particles with a flattening tool;
removing some of the stone particles;
allowing the landscape edging to stand for 20 to 30 hours for the adhesive to set; and
applying a heated asphalt mixture to another side of the base portion, folding the base portion and bonding the asphalt mixture to the base portion to form the flexible layer.

8. The manufacturing method of the landscape edging with a stone surface of claim 7, wherein the asphalt mixture comprises 20%-40% of bitumen, 5%-20% of a flexible substrate and 55%-75% of a filler in mass percentage.

9. The manufacturing method of the landscape edging with a stone surface of claim 8, wherein the flexible substrate is styrene butadiene-styrene or styrene butadiene rubber or styrene-ethylene/butylene-styrene block copolymer or styrene ethylene/propylene-styrene block copolymer or polyisoprene.

10. The manufacturing method of the landscape edging with a stone surface of claim 8, wherein the filler is calcium carbonate powder or wollastonite.

11. The manufacturing method of the landscape edging with a stone surface of claim 7, further comprising screening the stone particles with a sieve having a pore size of 1 mm to 5 mm.

12. An installation system for installing a landscape edging with a stone surface, comprising: the landscape edging with a stone surface as claimed in claim 1, an installing bracket, wherein one end of the installing bracket is provided with a fixing pile for insertion into the soil, and another end is provided with an installing groove configured to receive the edging body.

13. The installation system of the landscape edging with a stone surface of claim 12, wherein an outer wall of the fixing pile is provided with a plurality of barbs.

14. The installation system of the landscape edging with a stone surface of claim 12, wherein inner walls of two sides of the installing groove are correspondingly provided with snap protrusions.

15. The installation system of the landscape edging with a stone surface of claim 14, wherein each of the snap protrusions has a trapezoidal cross section.

16. The installation system of the landscape edging with a stone surface of claim 12, wherein a bottom of the fixing pile has a triangular cross section.

17. The installation system of the landscape edging with a stone surface of claim 12, wherein an intermediate shaft of the fixing pile and a central axis of the installing groove are eccentrically disposed.

18. The installation system of the landscape edging with a stone surface of claim 13, wherein a side of each barb is provided with an arc-shaped surface.

19. The installation system of the landscape edging with a stone surface of claim 12, further comprising a connecting member for joining two adjacent edging bodies; and wherein the connecting member is provided with a clamping groove for gripping one of the edging bodies.

* * * * *